June 19, 1928.
L. W. HOUSTON
1,674,113
HIGH PRESSURE SAFETY VALVE
Filed Nov. 22, 1926
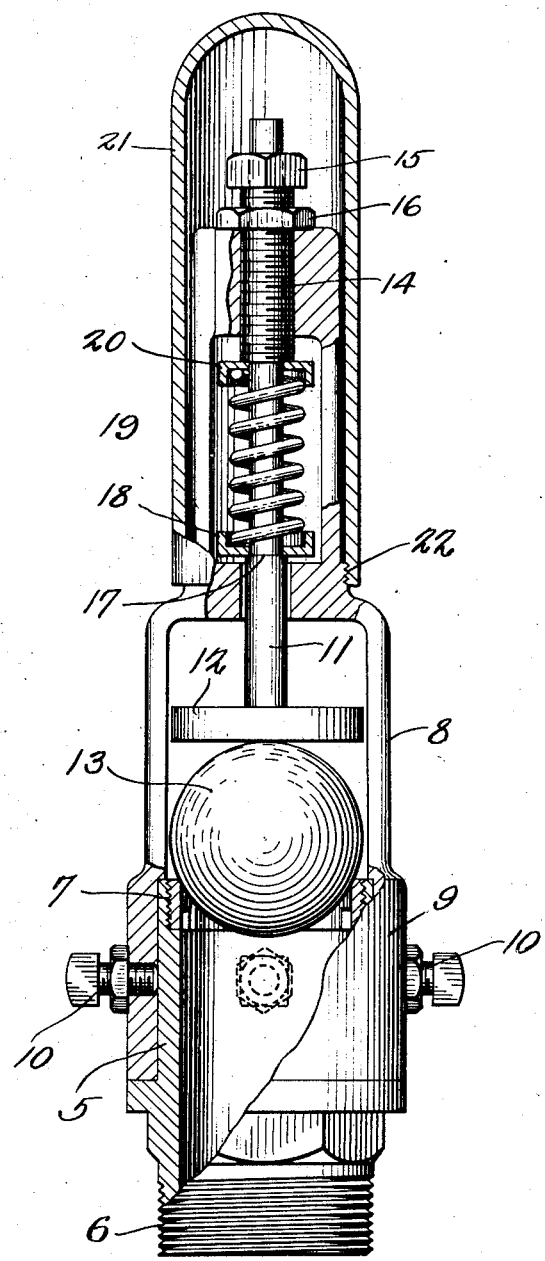
L. W. Houston
Inventor
By C. A. Snow & Co.
Attorneys.

Patented June 19, 1928.

1,674,113

UNITED STATES PATENT OFFICE.

LEONARD W. HOUSTON, OF TULSA, OKLAHOMA.

HIGH-PRESSURE SAFETY VALVE.

Application filed November 22, 1926. Serial No. 149,972.

The present invention relates to high pressure safety valves and aims to provide novel means whereby the steam exhausting therethrough will be directed laterally away from the push rod of the valve, to the end that corrosion will not occur at the push rod to restrict movement thereof.

Another important object of the invention is to provide a valve of this character supplied with a removable valve seat so that the valve seat may be replaced or repaired with facility.

A still further object of the invention is to provide a valve of this character embodying a ball which may move under the pressure of the steam exhausting from the valve to insure a true seating of the valve at all times.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

The figure illustrates a valve of a construction in accordance with the present invention, the same being shown partly in section.

Referring to the drawing in detail, the reference character 5 indicates the base of the valve which is provided with a lower threaded portion 6, whereby the same may be positioned in an opening of a boiler or pipe line.

The upper portion of the base is formed with an inner cut away portion provided with threads to receive the valve seat 7 to the end that the valve seat may be readily and easily removed, should the same become damaged or otherwise rendered inoperative.

The reference character 8 indicates the frame of the valve which has a lower supporting section 9 provided with openings to receive the bolts 10 that pass therethrough to engage the base 5 to secure the frame in position.

The upper portion of the frame has openings to accommodate the push rod 11 that is provided with a head 12 that contacts with the ball valve 13 that normally seats at 7 to close the valve.

As shown, the push rod 11 extends through the upper end of the valve frame and through the sleeve 14 which is threaded in an opening in the upper portion of the frame, the same being provided with a nut 15 at its upper end, whereby the sleeve may be rotated. Disposed above the frame and operating on the sleeve 14, is a lock nut 16 which is designed to hold the sleeve in its positions of adjustment.

Formed on the push rod is a shoulder 17 that provides a seat for the cup 18 that houses the lower extremity of the coiled spring 19, the upper extremity of the coiled spring 19 resting in the inverted cup-shaped washer 20 that is forced against the lower end of the sleeve 14 by the action of the spring.

Thus it will be seen that due to this construction, the tension of the coiled spring will be regulated to permit the valve 13 to operate under various degrees of pressure.

At the upper end of the frame is a dust cap 21 that has a threaded portion cooperating with the threads 22 of the frame, so that the dust cap may be securely held in position to guard the spring and mechanism of the valve against foreign matter.

In the operation of the device when the pressure of steam in the boiler or pipe with which the valve is connected exceeds the pressure exerted by the spring 19, the valve 13 will be unseated allowing the steam to exhaust. Due to the construction of the valve, it is obvious that the steam will be directed laterally from the push rod and the head is of such a diameter that the push rod will be protected against moisture collecting thereon to cause corrosion, which restricts movement of the push rod to defeat the purpose of the invention.

I claim:

A high pressure valve including an open valve frame to be positioned on a supporting section, the supporting section having a valve seat, a ball valve operating on the valve seat and disposed within the open valve frame, an upper section forming a part of the open valve frame, a spring pressed member extending into the upper section, a substantially flat disk like head forming a part of the spring pressed member, the diameter of the head being equal to the diameter of the ball valve to prevent steam from passing upwardly into the upper section, and a cover for the upper section.

In testimony that I claim the foregoing as my own, I have hereto affixed my signature.

LEONARD W. HOUSTON.